United States Patent
Schwan et al.

(10) Patent No.: US 8,336,609 B2
(45) Date of Patent: Dec. 25, 2012

(54) METHOD FOR CONTROLLING THE FEED AIR TEMPERATURE OF A PASSENGER AIRCRAFT

(75) Inventors: Torsten Schwan, Pinneberg (DE); Michael Markwart, Halstenbek (DE)

(73) Assignee: Airbus Deutschland GmbH, Hamburg (DE)

( * ) Notice: Subject to any disclaimer, the term of this patent is extended or adjusted under 35 U.S.C. 154(b) by 1599 days.

(21) Appl. No.: 10/580,944

(22) PCT Filed: Dec. 30, 2004

(86) PCT No.: PCT/EP2004/014849
§ 371 (c)(1), (2), (4) Date: May 30, 2006

(87) PCT Pub. No.: WO2005/063572
PCT Pub. Date: Jul. 14, 2005

(65) Prior Publication Data
US 2007/0130970 A1    Jun. 14, 2007

(30) Foreign Application Priority Data

Dec. 30, 2003  (DE) .................................. 103 61 688

(51) Int. Cl.
*B60H 1/00* (2006.01)
*G05D 23/00* (2006.01)

(52) U.S. Cl. ........ 165/203; 165/202; 165/212; 165/289; 454/76

(58) Field of Classification Search ............... 165/202, 165/203, 205, 206, 212, 213, 216, 41, 42, 165/289; 454/76
See application file for complete search history.

(56) References Cited

U.S. PATENT DOCUMENTS

| 2,851,254 | A | * | 9/1958 | Messinger et al. | 165/216 |
| 2,870,698 | A | * | 1/1959 | Best | 165/42 |
| 2,937,011 | A | * | 5/1960 | Brahm | 165/203 |
| 3,711,044 | A | * | 1/1973 | Matulich | 165/212 |
| 3,788,386 | A | * | 1/1974 | Demaray | 165/216 |

(Continued)

FOREIGN PATENT DOCUMENTS

DE   4308466 C1   8/1994

(Continued)

OTHER PUBLICATIONS

Translation of Office Action from Japanese Patent Office describing three above-identified Japanese references, pp. 1 and 2.

(Continued)

*Primary Examiner* — Ljiljana Ciric

(74) *Attorney, Agent, or Firm* — Wood, Herron & Evans, LLP

(57) ABSTRACT

A passenger aircraft includes a cabin subdivided into a plurality of cabin zones supplied with feed air from respective supply lines, a plurality of temperature sensors, and an electronic control unit coupled to the plurality of temperature sensors. The plurality of temperature sensors measures a plurality of individual ambient temperature values associated with different locations in at least one of the plurality of cabin zones. The electronic control unit derives a derived ambient temperature value for the at least one cabin zone from the plurality of individual ambient temperature values. The electronic control unit then controls a temperature of the feed air supplied to the at least one cabin zone based on the difference between the derived ambient temperature value and a room temperature target value for the at least one cabin zone.

8 Claims, 3 Drawing Sheets

U.S. PATENT DOCUMENTS

Figure 1:
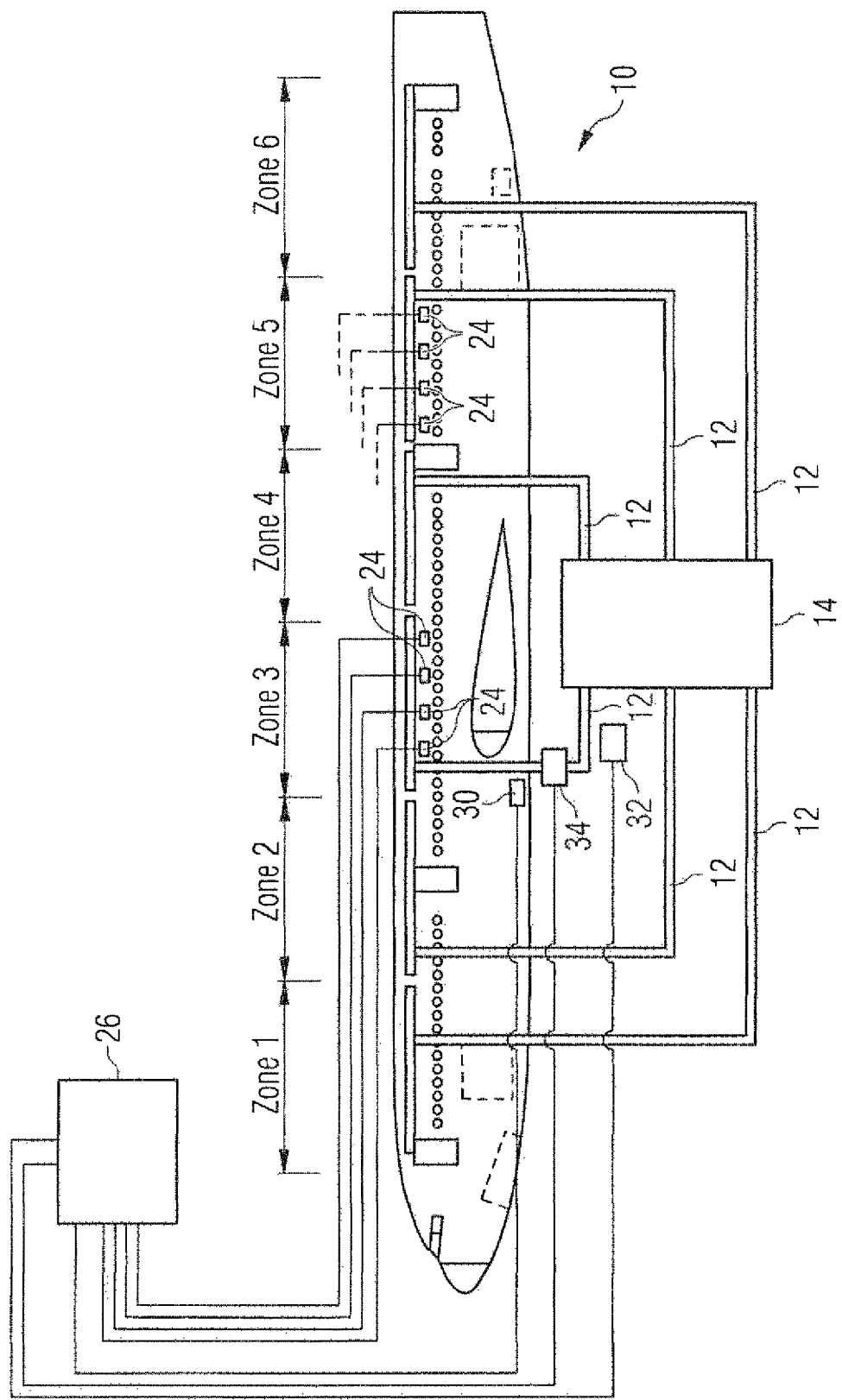

| | | | |
|---|---|---|---|
| 4,114,442 | A | 9/1978 | Pratt |
| 4,200,910 | A | 4/1980 | Hall |
| 4,660,759 | A | 4/1987 | Barnard et al. |
| 4,819,715 | A | 4/1989 | Kobayashi |
| 5,145,124 | A | 9/1992 | Brunskill et al. |
| 5,479,983 | A | 1/1996 | Fischer et al. |
| 5,545,084 | A * | 8/1996 | Fischer et al. ............ 454/76 |
| 7,775,447 | B2 * | 8/2010 | Scherer et al. ............ 165/203 |
| 7,802,732 | B2 * | 9/2010 | Scherer et al. ............ 165/205 |

FOREIGN PATENT DOCUMENTS

| | | |
|---|---|---|
| DE | 19927606 A1 | 12/2000 |
| EP | 0131888 | 1/1985 |
| FR | 2485473 | 12/1981 |
| GB | 1383705 | 2/1974 |
| JP | 7132896 | 5/1995 |
| JP | 11264684 | 9/1999 |
| JP | P3011687 | 12/1999 |
| SU | 304186 | 1/1971 |

OTHER PUBLICATIONS

English Translation of Decision on Granting a Patent for Invention, Russia Patent Office, Mar. 27, 2009.

Chinese document, entitled "University of Physics Experiments,", Sep. 30, 1999.

English translation of Office Action from Chinese Patent Office citing "University of Physics Experiments," and describing its relevance to the current application, State Intellectual Property Office of People's Republic of China, Sep. 4, 2009.

* cited by examiner

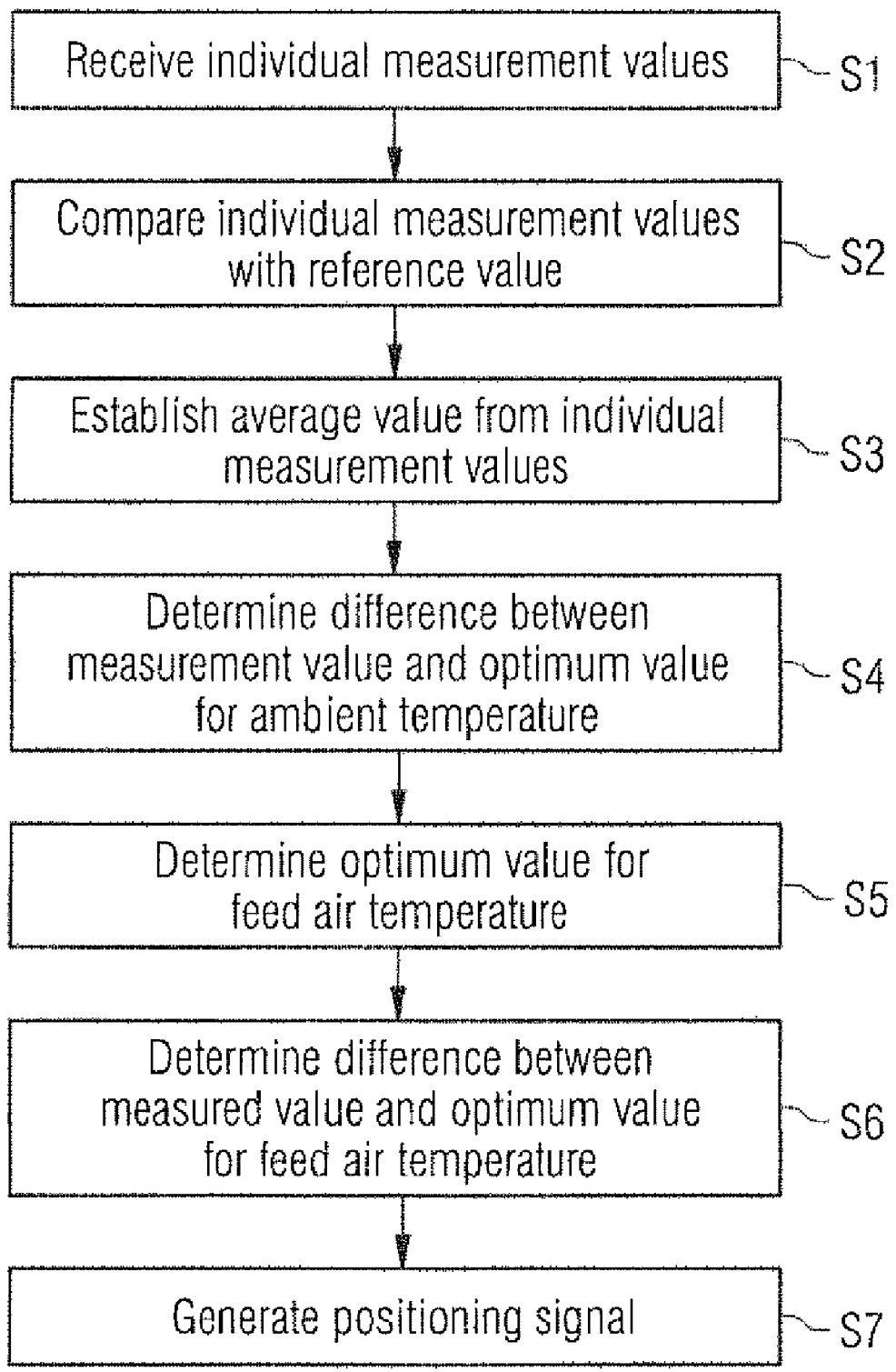

METHOD FOR CONTROLLING THE FEED AIR TEMPERATURE OF A PASSENGER AIRCRAFT

The invention relates to the control of the feed air temperature of a passenger aircraft. When reference is made to 'control' in this context, limitation to true control systems is in no way intended, whereby a desired value is set directly by means of a controlled system without a feedback loop. Quite on the contrary, the term 'control' within the framework of the invention also represents regulation, whereby a regulatory difference is determined by comparing an optimum value with a recorded actual value, and this is entered into a regulator.

A pleasant ambient atmosphere is an important criterium in modern passenger aircraft in order to be a successful flight operator within the market. One key factor for a pleasant ambient atmosphere is the ambient temperature in the aircraft cabin. This is regulated by means of the temperature of the feed air which is injected into the cabin.

It is standard practice to sub-divide the cabin of a passenger aircraft into several cabin zones, and to supply each cabin zone with air from its own supply line. For this, each cabin zone has its own temperature regulation circuit which regulates the temperature of the feed air in the cabin zone in question in such a way that the ambient temperature in the cabin zone has a required optimum value. In this way, the ambient temperature for each cabin zone can be specially regulated to a target value.

It has, however, been shown, that previously it was not always possible to provide a pleasant ambient temperature in the whole cabin. In particular it has been shown that it can be too hot in many zones of the cabin, whilst it can be too cold in other zones of the cabin, and at the same time, there can be a pleasant temperature in other cabin zones although the regulation circuits for the different zones are working correctly as such.

The aim of the invention, therefore, is to make it possible to provide a reliable, even, pleasant ambient temperature in the whole cabin of a passenger aircraft.

In order to provide a solution to this problem, the invention proposes a method for controlling the temperature of the feed air supplied to a cabin area of a passenger aircraft whereby a temperature sensor system takes a measurement value for ambient temperature in the cabin area, and the temperature of the feed air is controlled dependent upon a deviation of the ambient temperature measurement value in relation to an ambient temperature optimum value. In accordance with the invention it is proposed here that the ambient temperature measurement value is deduced from a number of individual temperature values for different points within the cabin area.

With the solution in accordance with the invention, several individual temperature values which reflect the ambient temperature at different points within this cabin area are determined in order to regulate the ambient temperature in a particular cabin area of the aircraft to a required target value. An ambient temperature measurement value is then deduced from the individual temperature values, and this is compared with a reference value. The reference value gives the target or optimum temperature within the cabin area. The difference between the ambient temperature measurement value and the reference value is then fed into a regulation circuit for the feed air temperature as a regulatory difference.

With the solution in accordance with the invention, therefore, individual values for several different places contribute to the temperature value which is then compared with the optimum value for ambient temperature. With traditional solutions, however, just one temperature reading is taken at regular intervals in each cabin zone by a single temperature sensor in a discreet location. It was found that the air in the cabin can occasionally be relatively unsettled, and that this unsettled air can lead to corresponding fluctuations in the readings taken by a temperature sensor in the cabin zone. If there is only one temperature sensor in each cabin zone, this leads to correspondingly strong fluctuations in the temperature of the injected feed air.

It has also been shown that distinct temperature differences can occur within one and the same cabin zone in the passenger cabin which can not be recorded by just one temperature sensor. It can then be that the temperature at the location point of the sensor is not representative of the average temperature in the whole cabin zone. This can mean that the required target temperature is, indeed, achieved at the location point of the temperature sensor, but that the temperature sensitivity of the passengers sitting in the cabin zone in question can vary considerably and they find it too hot or too cold. The flight comfort for the passengers is then correspondingly low.

On the other hand, the strong influence of localised and periodic temperature fluctuations can be reduced at least by the use of several representative individual temperature values for different points within a particular cabin area. The ambient temperature measurement value deduced from the individual temperature values can much better represent the overall temperature of the cabin area in question than the measurement value taken by a single, discreet sensor. Because of the reduced response to localised temperature interference, a pleasant ambient atmosphere for the passengers can be reliably established for the whole cabin.

The individual temperature values can, at least partially, be taken for points in the cabin area along the length of the aircraft positioned at a certain distance from one another. It is also possible, to take at least some of the individual temperature values for points in the cabin area located at a certain distance from one another in the cross-direction of the aircraft.

It is appropriate to determine the ambient temperature measurement value by means of at least some of the individual temperature values. In the simplest form a balanced arithmetical calculation is carried out using all of the individual temperature values. Different individual temperature values can, of course, be given different weight, for example when investigations reveal that at some measurement points in the cabin area there is more likelihood of temporary temperature fluctuations than in others. The individual temperature values from these points can be more likely to show temperature fluctuations with less effect upon the ambient temperature measurement value than other individual temperature values.

Other calculation methods are basically possible other than arithmetical calculation, for example geometric calculation. By establishing the average value, it is possible for localised temperature interference at one sensor location to have a reduced effect upon the injection temperature of the feed air.

With a preferred design, each individual temperature value is compared with at least one reference value. Only those individual temperature values which meet certain conditions with regard to the reference value are included in the ambient temperature measurement value. In this way, individual temperature values which are subjected to particularly pronounced interference or falsification can be filtered out.

The invention also relates to a passenger aircraft, the cabin of which is sub-divided into several cabin zones, each supplied with feed air from its own supply line. In accordance with the invention, such an aircraft includes a temperature sensor system by means of which, for at least some of the cabin zones, a number of individual temperature values are established for different points within the cabin zone in question, and an electronic control unit associated with the temperature sensor system, which is provided in order to deduce one ambient temperature measurement value from the individual temperature values of a cabin zone and to control the temperature of the feed air supplied to this cabin zone, dependent upon a deviation of the ambient temperature measurement value for this cabin zone in relation to an ambient temperature optimum value.

The temperature sensor system can include a number of discreet temperature sensors in this cabin zone, each of which provides an individual temperature value in order to establish individual temperature values for a cabin zone.

Figure 2:
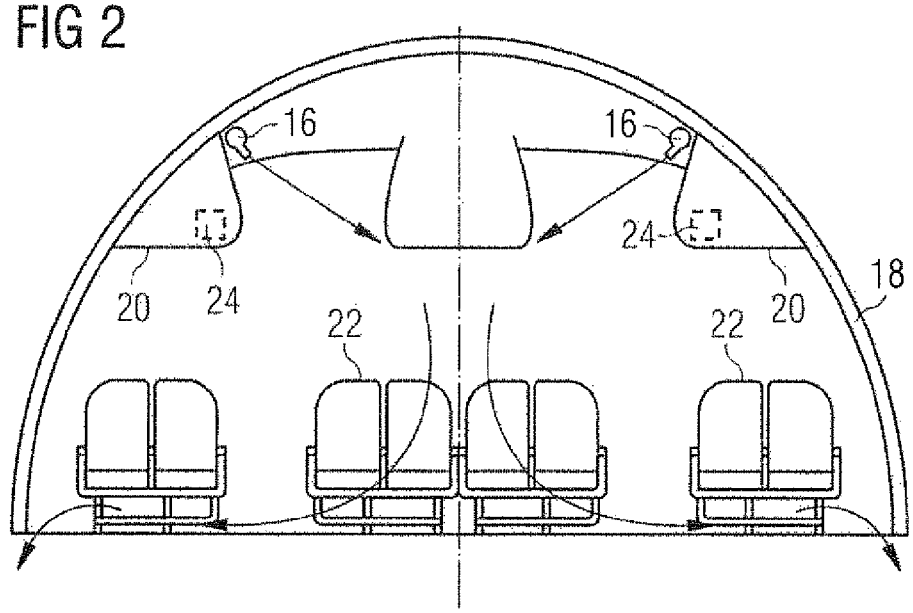
Figure 3:
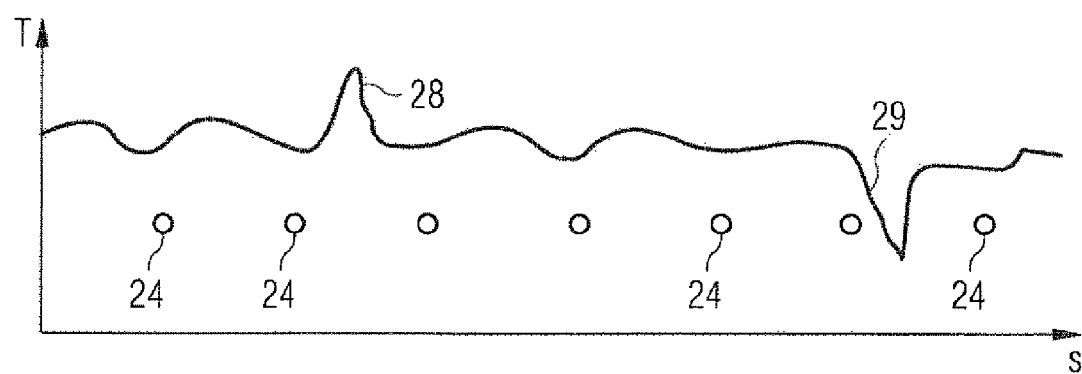

In the following, the invention is described in greater detail with reference to the attached drawings:

FIG. 1 schematically shows a passenger aircraft with components for temperature-regulated air supply to the aircraft cabin, FIG. 2 schematically shows a cross-sectional view of the cabin, FIG. 3 schematically shows a diagram which illustrates a possible temperature sequence in the aircraft cabin, FIG. 4 shows a flow diagram which illustrates the steps of a regulation procedure for the aircraft cabin temperature.

FIG. 1 shows an example of a passenger aircraft generally identified by 10, the cabin of which is sub-divided into several cabin zones which follow on from one another along the length of the aircraft 10. Cabin here signifies the internal space of the aircraft 10 in which the passengers and the flight crew are located. In the example illustrated, the cabin of the aircraft 10 is sub-divided into six zones, the length and extent of which are shown in FIG. 1 by arrows. These zones are not zones sectioned off from one another. Rather the term cabin zone signifies an area of the cabin which has its own supply circuit for feed air. The cabin zones can also be identified as temperature regulation zones.

A main supply line 12 is assigned to each cabin zone, and the cabin zone in question is supplied with feed air by this. In accordance with the number of cabin zones, six main supply lines 12 are provided in the example shown by FIG. 1. The main supply lines are connected to a mixing chamber 14 from which they are supplied with feed air. The air supplied from each main supply line 12 is driven into the cabin zone in question via a system of air outlets 16 (FIG. 2) into the cabin interior. Arrows in FIG. 2 schematically illustrate the flow direction of the feed air being injected into the cabin interior. One can see that the feed air is typically injected in the upper section of the cabin, identified by 18 in FIG. 2, for example close to the storage lockers 20 for hand luggage. The feed air flows past the passenger seats 22 and is expelled to the side at floor level in the cabin 18.

The temperature of the injected feed air determines the internal ambient temperature in the cabin 18. In order to create a pleasant ambient atmosphere in the cabin 18, the temperature of the feed air for each cabin zone respectively is regulated by means of a temperature regulation circuit in such a way that the ambient temperature in the cabin zone in question has a desirable target value. For this, each cabin zone is fitted with several temperature sensors 24, each of which sends a signal measurement signal to an electronic control unit 26. FIG. 1 only shows such temperature sensors 24 in cabin zones 3 and 5 for reasons relating to clarity. It is clear that temperature sensors 24 are also provided in the other cabin zones 1, 2, 4 and 6. The number of temperature sensors 24 can be the same in each cabin zone. But, for at least some of the cabin zones it can be different. The temperature sensors 24 in each cabin zone are preferably distributed along the whole length of the cabin zone in question, essentially the same distance apart from one another. The sensors 24 can be arranged in a line, one behind the other. It is also possible to position two or more temperature sensors 24 at the same position along the length of the aircraft, but distanced from one another cross-wise, or at different positions lengthwise. This possibility is shown in FIG. 2 by the temperature sensor 24 drawn with hatches in the left half of the cabin 18. Particularly with aircraft with a wide fuselage and correspondingly wide rows of seats, it can make sense to position temperature sensors 24 not only lengthwise, but also distributed cross-wise. The temperature sensors 24 can, for example, be thermistor sensors with positive or negative temperature coefficients of the resistance value.

FIG. 3 shows an example of how the distribution of ambient temperature can appear along the length of the interior of a cabin zone. It can be clearly seen that the ambient temperature (identified by T in FIG. 3) can show relatively strong variations dependent upon its lengthwise location in the cabin zone in question (identified by s in FIG. 3). In this way, frequent localized peaks or reductions of ambient temperature can be recorded at many points within the cabin zone in question. In the FIG. 3 diagram this type of temperature peak 28 can be seen, whereas element number 29 indicates a localized temperature reduction. Fluctuations in ambient temperature in the cabin are not only location-dependent, but can also occur in relation to time. It can easily be that the temperature peak 28 of the diagram in FIG. 3 is found at another point along the axis s at a different point in time.

An example of a regulation method for the temperature of the feed air injected into each of the cabin zones is described by FIG. 4. This regulation method is realised by the control unit 26 which is provided with appropriate software and/or hardware for this.

In step S1, the control unit 26 receives individual measurement values from each temperature sensor 24 in a cabin zone. The individual values represent the temperature at the location point of the respective temperature sensor 24. In a subsequent step S2, the control unit 26 compares each of the individual measurement values with at least one pre-determined reference value. This comparison makes it possible to determine whether one or more of the individual measurement values has been so strongly interfered with that it is not taken into consideration for the later calculations. For example, an upper reference value (upper threshold) and a lower reference value (lower threshold) can be stored or defined in the control unit 26, which establish a temperature window. Only those individual measurement values which fall within this temperature window are used. Individual measurement values which fall outside of the temperature window are not taken into consideration. In accordance with another example, an average temperature value can be stored or defined in the control unit 26 as a reference value. The control unit 26 then compares each of the individual measurement values with this average reference value and tests whether the individual measurement value in question deviates from the reference value by more than a pre-determined amount. If the deviation is stronger than that allowed in relation to the average reference value, the individual measurement value in question will not be considered. Only those measurement values are used, the deviation from the reference value of which lies within the allowed amount.

After step 2 whereby all of those individual measurement values have been identified which meet the specified criteria in relation to at least one reference value, in step S3 the control unit 26 establishes an average value from the individual measurement values identified in this way, for example an arithmetical average value. This average value establishes a derived ambient temperature value for the cabin zone in question.

The derived ambient temperature value established in step S3 is then compared in step S4 with an optimum value for the ambient temperature in the cabin zone in question stored in the control unit 26. The difference between the derived ambient temperature value and the ambient temperature optimum value is established. With reference to this difference, in a subsequent step S5, the control unit 26 determines an optimum value for the temperature of the feed air injected into the cabin zone in question. For this, the control unit 26 works as a regulator which establishes the difference between the derived ambient temperature value and the ambient temperature optimum value as a regulatory difference.

The optimum value for the feed air temperature determined in step S5 is then compared with a current value for the feed air temperature in step S6. This current value is provided by a temperature sensor 30 (FIG. 1) which measures the temperature of the air in the main supply line 12 for the cabin zone in question. From the optimum value for the feed air temperature and the current value, the control unit 26 determines a difference value which is communicated to a further regulator as a regulation difference. With reference to the output signal from the further regulator, the control unit produces positioning signals in step S7 for one or several components, by means of which the temperature of the feed air injected is influenced. An example of such a component is an electric heater 32 as schematically represented in FIG. 1. Another example is a so-called trim air valve (schematically represented by 34 in FIG. 1). By means of appropriate control of such positioning components dependent upon the single measurement signals from the temperature sensors 24 and the measurement signal from the temperature sensor 30, the control unit 26 regulates the temperature of the feed air injected so that a constantly pleasant ambient atmosphere prevails in the cabin zone in question.

The invention claimed is:

1. A passenger aircraft comprising:
    a cabin sub-divided into a plurality of cabin zones supplied with feed air from respective supply lines;
    a plurality of temperature sensors located in at least one of the plurality of cabin zones and operable to measure a plurality of individual ambient temperature values for different locations in the at least one cabin zone; and
    an electronic control unit coupled to the plurality of temperature sensors and configured to derive a derived ambient temperature value for the at least one cabin zone from the plurality of individual ambient temperature values for the at least one cabin zone, and further configured to control a temperature of feed air supplied to the at least one cabin zone based on a difference between the derived ambient temperature value for the at least one cabin zone and a room temperature target value for the at least one cabin zone.

2. The passenger aircraft of claim 1, wherein at least a portion of the plurality of temperature sensors are positioned at different locations in the at least one cabin zone.

3. The passenger aircraft of claim 2, wherein at least a portion of the plurality of temperature sensors are spaced from each other along a lengthwise direction of the at least one cabin zone.

4. The passenger aircraft of claim 3, wherein each of the plurality of temperature sensors are spaced from each other along a lengthwise direction of the at least one cabin zone.

5. The passenger aircraft of claim 1, wherein the electronic control unit derives the derived ambient temperature value for the at least one cabin zone by averaging at least a portion of the plurality of individual ambient temperature values for the at least one cabin zone.

6. The passenger aircraft of claim 5, wherein individual ambient temperature values are weighted with respect to one another when averaging at least a portion of the plurality of individual ambient temperature values, in order to reduce the effect of temporary temperature fluctuations on the derived ambient temperature value.

7. A passenger aircraft comprising:
    a cabin sub-divided into a plurality of cabin zones supplied with feed air from respective supply lines;
    a plurality of temperature sensors located in at least one of the plurality of cabin zones and operable to measure a plurality of individual ambient temperature values for different locations in the at least one cabin zone; and
    an electronic control unit coupled to the plurality of temperature sensors and configured to derive a derived ambient temperature value for the at least one cabin zone from the plurality of individual ambient temperature values for the at least one cabin zone, and further configured to control a temperature of feed air supplied to the at least one cabin zone based on a difference between the derived ambient temperature value for the at least one cabin zone and a room temperature target value for the at least one cabin zone,
    wherein the electronic control unit derives the derived ambient temperature value for the at least one cabin zone by averaging at least a portion of the plurality of individual ambient temperature values for the at least one cabin zone, and
    wherein the electronic control unit compares each of the plurality of individual ambient temperature values for the at least one cabin zone to a predetermined reference value, and averages only the individual ambient temperature values that comply with a predetermined condition with respect to the predetermined reference value.

8. A passenger aircraft comprising:
    a cabin sub-divided into a plurality of cabin zones supplied with feed air from respective supply lines;
    a plurality of temperature sensors located in at least one of the plurality of cabin zones and operable to measure a plurality of individual ambient temperature values for different locations in the at least one cabin zone; and
    an electronic control unit coupled to the plurality of temperature sensors and configured to derive a derived ambient temperature value for the at least one cabin zone from the plurality of individual ambient temperature values for the at least one cabin zone, and further configured to control a temperature of feed air supplied to the at least one cabin zone based on a difference between the derived ambient temperature value for the at least one cabin zone and a room temperature target value for the at least one cabin zone,
    wherein the electronic control unit derives the derived ambient temperature value for the at least one cabin zone by averaging at least a portion of the plurality of individual ambient temperature values for the at least one cabin zone, and
    wherein the electronic control unit compares each of the plurality of individual ambient temperature values with an upper threshold value and a lower threshold value, and only averages the individual ambient temperature values that are determined to be lower than the upper threshold value and higher than the lower threshold value.

* * * * *